United States Patent [19]
Nakamura

[11] Patent Number: 5,567,100
[45] Date of Patent: Oct. 22, 1996

[54] TORQUE ENHANCING CLAMPING NUT

[75] Inventor: Daijiro Nakamura, Ono, Japan

[73] Assignee: Power Tool Holders Incorporated, Wilmington, Del.

[21] Appl. No.: 216,220

[22] Filed: Mar. 22, 1994

Related U.S. Application Data

[60] Continuation-in-part of Ser. No. 194,089, Feb. 9, 1994, which is a division of Ser. No. 31,311, Mar. 15, 1993.

[51] Int. Cl.⁶ .............................. F16B 37/08; F16B 37/16
[52] U.S. Cl. ..................... 411/433; 411/432; 411/437; 411/917
[58] Field of Search ................................ 411/427, 432, 411/433, 437, 917; 74/459, 499

[56] References Cited

U.S. PATENT DOCUMENTS

| | | |
|---|---|---|
| 3,614,900 | 10/1971 | Wahlmark ............................ 74/459 X |
| 3,756,092 | 9/1973 | Gartner ................................ 74/459 X |
| 4,434,586 | 3/1984 | Muller et al. . |
| 4,502,824 | 3/1985 | Dohse et al. . |
| 4,841,796 | 6/1989 | Teramachi ......................... 411/432 X |
| 4,864,884 | 9/1989 | Klinkenberg ...................... 411/433 X |
| 4,941,790 | 7/1990 | Kim . |
| 4,955,744 | 9/1990 | Barth et al. . |
| 4,976,071 | 12/1990 | Stabler . |
| 4,980,994 | 1/1991 | Helm et al. . |
| 5,022,188 | 6/1991 | Borst . |
| 5,042,207 | 8/1991 | Kim . |
| 5,161,334 | 11/1992 | Schaal et al. . |
| 5,388,942 | 2/1995 | Bonacina et al. . |

FOREIGN PATENT DOCUMENTS

| | | |
|---|---|---|
| 0034640A1 | 9/1981 | European Pat. Off. . |
| 0231500B1 | 12/1986 | European Pat. Off. . |
| 0497138A1 | 8/1992 | European Pat. Off. . |
| 0600854A1 | 6/1994 | European Pat. Off. . |
| 3012836C2 | 9/1985 | Germany . |
| 3523746A1 | 1/1987 | Germany . |
| 3702142A1 | 8/1988 | Germany . |
| 3824040C1 | 11/1989 | Germany . |
| 3903765A1 | 8/1990 | Germany . |
| 3903766A1 | 8/1990 | Germany . |
| 3613987C2 | 9/1990 | Germany . |
| 4031725A1 | 4/1992 | Germany . |
| 4102420A1 | 7/1992 | Germany . |
| 4209146A1 | 9/1992 | Germany . |
| 4238466C1 | 11/1992 | Germany . |
| 4243328C1 | 6/1994 | Germany . |
| 4305317A1 | 9/1994 | Germany . |
| WO92/04549 | 3/1992 | WIPO . |

OTHER PUBLICATIONS

Abstract of EP 558277 A1 –Dated Feb. 28, 1992.
Abstract of EP 345 271 A –Dated Feb. 21, 1987.
Abstract of EP 330 672 –Dated Jan. 15, 1987.
Abstract of DE 3903–765–A–Dated Feb. 9, 1989.
Abstract of DE 3903–766–A–Dated Feb. 9, 1989.
Abstract of DE 4102420–A–Dated Jan. 28, 1991.
Abstract of DE 3824–040–C–Dated Jul. 15, 1988.
Abstract of DE 3613–987–A–Dated Apr. 25, 1986.
Abstract of DE 3523–746–A–Dated Jul. 3, 1985.
Abstract of DE 3012–836–Dated Apr. 2, 1980.
U.S. Application Serial No. 08/194,089, Filed Feb. 9, 1994. (No Copy)
U.S. Application Serial No. 08/031,311, Filed Mar. 15, 1993. (No Copy)

*Primary Examiner*—Neill R. Wilson
*Attorney, Agent, or Firm*—Dority & Manning

[57] ABSTRACT

A tightening screw in which a rotating ring is rotatably held on a flange ring, a screw member having female threads in the same pitch as the male threads of the bolt to be fitted, with the female thread diameter formed larger than the male thread diameter, is rotably held eccentrically so that some of the female threads of the screw member may be engaged with the male threads preliminarily, and the flange is fixed at the time of tightening so that the rotating ring may revolve the screw member, and thereby the decelerated rotation created in the screw member produces a large tightening force to increase the torque.

14 Claims, 3 Drawing Sheets

TORQUE ENHANCING CLAMPING NUT

The present application is a Continuation-in-Part application of U.S. Ser. No. 08/194,089 filed Feb. 9, 1994, which is a Divisional application of Ser. No. 08/031,311 filed Mar. 15, 1993.

BACKGROUND OF THE INVENTION

The invention relates to a device to be used as a tightening screw (for example, a nut) for tightening a rotary tool, such as the wheel of a hand grinder and circular saw or hand saw, to a mounting threaded part (for example, male threading) spirally provided in a drive shaft. The device is capable of powerful tightening with a small rotary input, and also of being loosened with relative ease. The device includes a means for regulating excessive tightening.

To mount a rotary tool such as a grinding wheel and circular saw on a driving shaft, hitherto, a flange and male threads were formed at the end portion of the driving shaft, and the rotary tool was fitted to the male threaded part, and a tightening screw with female threads (such as a nut) was fitted on its outer part, and by tightening the nut, the rotary tool was fixed between the nut and the flange.

In tightening and loosening operations of such a nut, however, a power tool such as a wrench was generally used, and therefore a sufficient amplification may not be obtained because only this power tool is used for amplifying the force to tighten or loosen the nut.

Besides, in the use of such a rotary tool, if the rotary tool is used with an impact, the nut may be tightened more than desired by the impact and its reaction, and it may not be removed by such power tool as a wrench. In this case the nut cannot be removed unless the rotary tool is broken in an extreme case.

OBJECTS AND SUMMARY OF THE INVENTION

According to the present invention, a tightening screw is provided in which a rotating ring is rotatably held on a flange ring. A screw member having female threads in the same pitch as the male threads of the bolt to be fitted, with the female thread diameter formed larger than the male thread diameter, is rotatably held eccentrically so that some of female threads of the screw member may be engaged with the male threads preliminarily. The flange ring is fixed at the time of tightening so that the rotating ring may rotate the screw member, and thereby the decelerated rotation created in the screw member produces a large tightening force to increase the torque.

It is a first object of the invention to present a tightening screw capable of obtaining a large tightening force or loosening force with a small rotary input, mounting the object securely, tightening or loosening directly by hand, without using a power tool, because of the generation of a powerful rotational force increased in torque, and enhancing the attaching and detaching manipulation of the tightening screw.

It is a second object of the invention to present a tightening screw capable of attaching and detaching the tightening screw quickly without taking time in attaching and detaching because the rotary motion of the rotating ring or operating ring is directly the rotary motion of the screw member until the flange ring of the tightening screw abuts against the object to be tightened to fix the rotary motion.

It is a third object of the invention to present a tightening screw capable of preventing excessive tightening of the tightening screw due to rotation of the object to be tightened, by interspacing a flange ring for keeping a relative rotary motion between the revolving ring and the object to be tightened, so that the revolving ring may not rotate together with the object to be tightened.

It is a fourth object of the invention to present a tightening screw capable of distributing uniformly the uneven loads of screw members, rotating the tightening screw smoothly, and tightening with an effective increased torque, by disposing plural screw members uniformly on the circumference around the bolt to be tightened.

Additional objects and advantages of the invention will be set forth in part in the following description, or may be obvious from the description, or may be learned through practice of the invention.

DETAILED DESCRIPTION OF THE PREFERRED EMBODIMENTS

Figure 1:
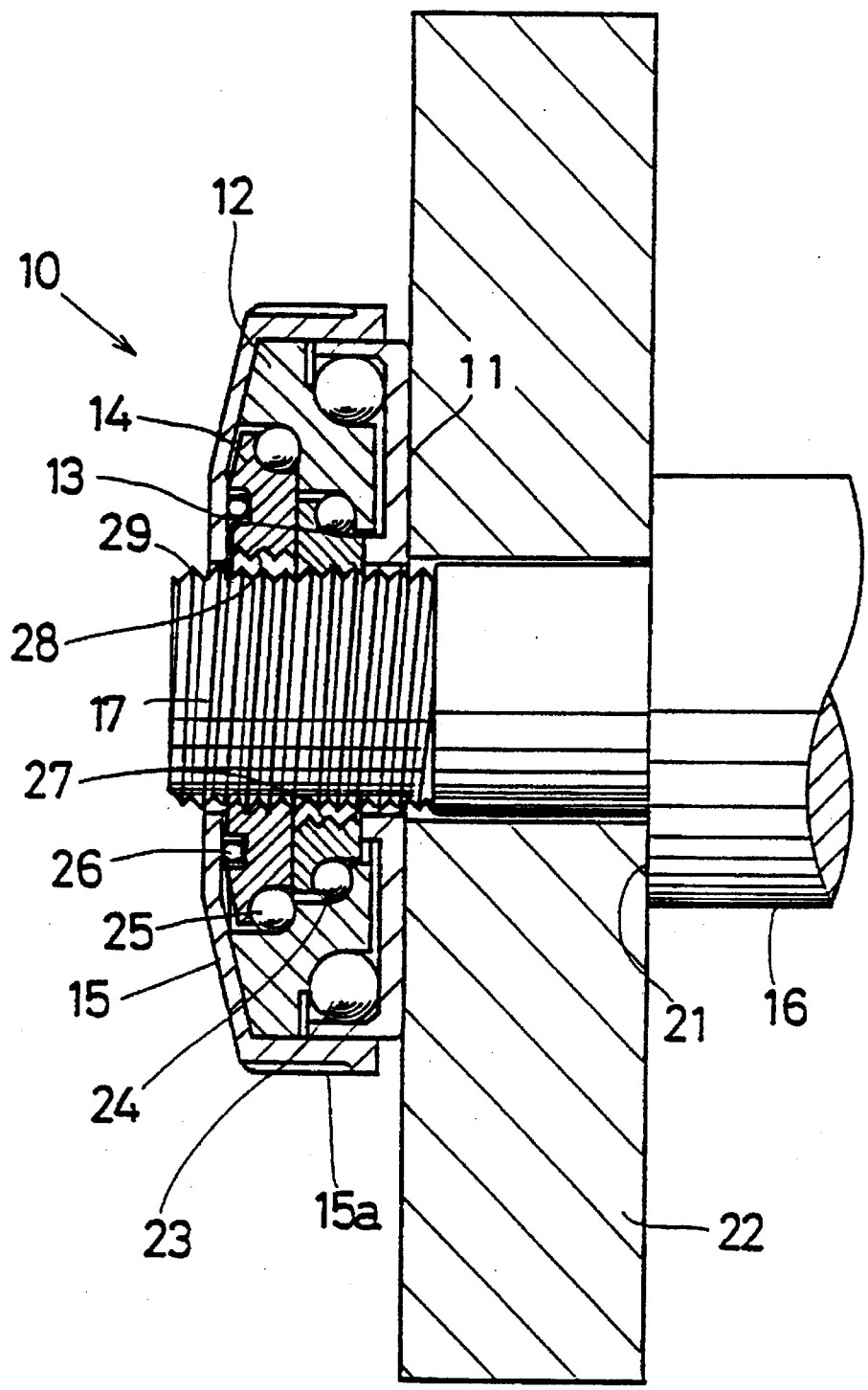
FIG. 1 is a sectional view of a tightening screw according to the invention.

Reference will now be made in detail to the presently preferred embodiments of the invention, one or more examples of which are illustrated in the drawings. Each example is provided by way of explanation of the invention, and not as a limitation of the invention. In fact, it will be apparent to those skilled in the art that various modifications and variations can be made in the invention without departing from the scope and spirit of the invention. The numbering of components is consistent throughout, with the same components having the same number.

Figure 2:
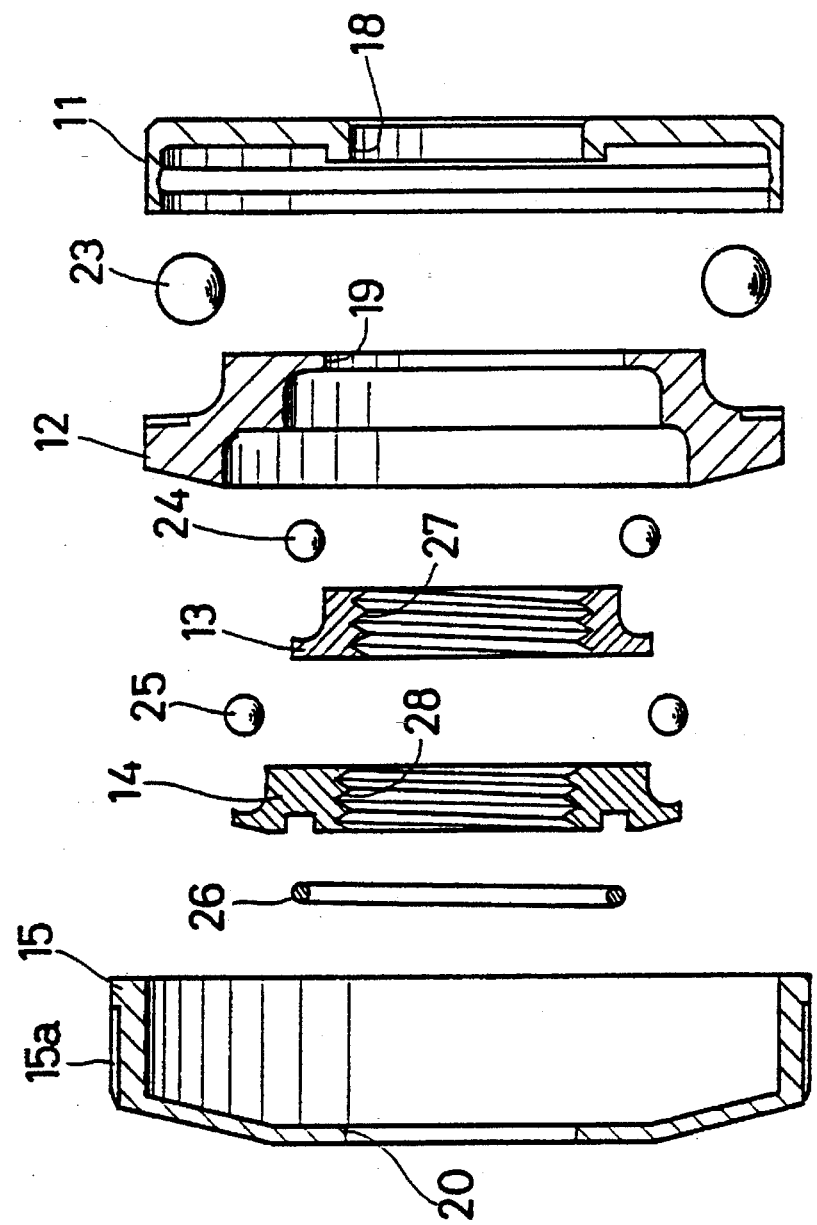
FIG. 2 is an exploded sectional view of the tightening screw shown in FIG. 1.

The drawings show a tightening screw, and in FIG. 1 and FIG. 2 the tightening screw 10 is composed of a flange ring 11, a rotating ring 12, screw members of a first nut ring 13 and a second nut ring 14, and an operating ring 15, and in each central part of the flange ring 11, rotating ring 12 and operating ring 15, for example, insertion holes 18; 19, 20 are formed for inserting mounting bolt 17 of a drive shaft 16 of a power tool such as hand grinder. A flange 21 is formed on the drive shaft 16, and a rotary tool 11 to be tightened, for example a wheel of a hand grinder, is tightened and fixed between the flange 21 and the tightening screw 10 on the mounting bolt 17.

The rotating ring 12 is rotatably held in the flange ring 11 through a bearing 23, and the nut rings 13, 14 are rotatably held in the rotating ring 12 through bearings 24, 25, respectively. The rotating ring 12 is press-fitted into the operating ring 15, and the rotating ring 12 and operating ring 15 are fixed in one body. On the outer periphery of the operating ring 15, a knurling 15a for rotating is formed. Numeral 26 is an O-ring for sealing the gap.

Figure 3:
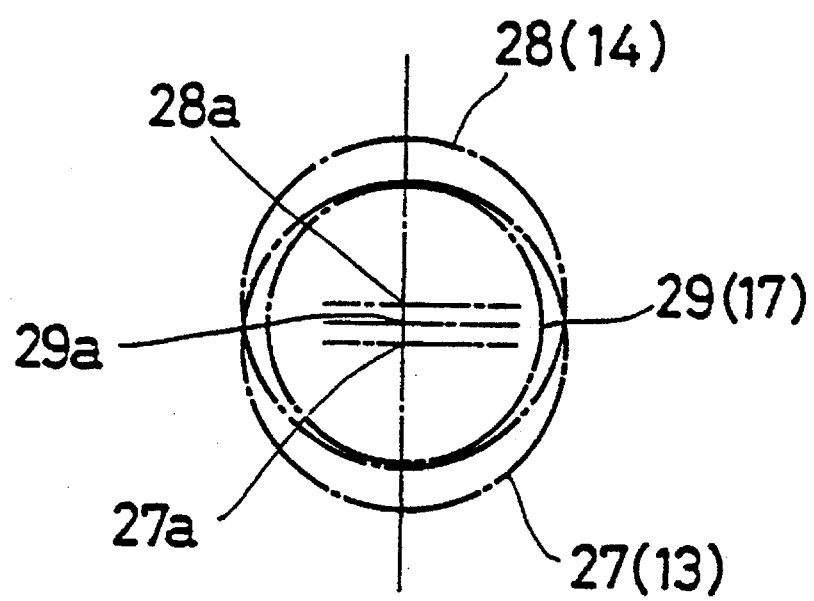
FIG. 3 is an explanatory diagram showing an eccentric state of the nut ring.

Female threads 27, 28 cut in the nut rings 13, 14 are formed in the same pitch as the male threads 29 of the mounting bolt 17, and the screw diameter of the female threads 27, 28 is greater than that of the male threads 29. The nut rings 13, 14 are held in the rotating ring 12 by eccentricity so that each part of the female threads 27, 28 may be engaged with the male threads 29 of the mounting bolts 17. The relative eccentric positions of the first nut ring 13 and second nut ring 14 are spaced at an interval of 180 degrees so as to be equally distributed on the circumference of the center 29a of the mounting bolt 17 (male threads 29) as shown in FIG. 3. Meanwhile, FIG. 3 shows the effective diameters of the female threads 27, 28 and male threads 29, and 27a is the center of the female threads 27, 28a is the center of the female threads 28, and these centers 27a , 28a are remote from the center 29a of the male threads 29 by 180 degrees.

By using thus composed tightening screw 10, in order to mount the rotary tool 22 on the mounting bolt 17 of the drive shaft 16, the operating ring 15 of the tightening screw 10 is directly rotated by manual operation on the male threads 29 of the mounting bolt 17, and the female threads 27, 28 of the both nut rings 13, 14 are screwed onto male threads 29. In this screwing operation, if the flange ring 11 does not contact with the rotary tool 22, the operating ring 15, flange ring 11, rotating ring 12, and both nuts 13, 14 are rotated together by the assembling load or internal friction of the components forming screw 10. In other words, the components are rotatably fixed relative to each other due to internal friction and screw 10 is rotated as a unitary object until flange ring 11 contacts rotary tool 22. The tightening screw 10 is fed forward through rotation by the engagement between the contact parts of the female threads 27, 28 of the both nut rings 13, 14 and the male threads 29 of the mounting bolt 17.

Subsequently, when the flange ring 11 abuts against the rotary tool 22, its rotation is loaded through contact with rotary tool 22 and rotation of the flange ring 11 is stopped by this load. Further rotary input applied to the rotating ring 12 through rotation of the operating ring 15 is thus applied to both nut rings 13, 14 forcing the nut rings to roll around threaded shaft 17. The nut rings 13, 14 make rolling motions so that the female threads 27, 28 engage and roll on the periphery of the male threads 29 of the mounting bolt 17. Due to the eccentricity between nuts 13, 14, and bolt 17, the nut rings 13, 14 travel in an eccentric path relative to rotating ring 12 providing a rolling contact between female threads 27, 28 and male threads 29. As the nuts 13, 14 are eccentric in that the female threads 27, 28 are longer than the male threads 29 in peripheral length, this revolution means slowdown of the screw pitch feed of the rotating ring 12 resulting in a torque increase in the nut rings 13, 14. By the revolution of the increased torque, the nut rings 13, 14 are screwed to the mounting bolt 17 so that the rotary tool 22 may be tightened and fixed to the mounting bolt 17 with the tightening force of the increased torque.

Incidentally, when the two nut rings 13, 14 are uniformly disposed as shown in FIG. 3, the bias load with increased torque of the nut rings 13, 14 uniformly acts on the periphery of the mounting bolt 17 since the rolling contact of female threads 27, 28 with male threads 29 is offset by 180 degrees, so that smooth tightening may be achieved.

The torque increase rate of the nut rings 13, 14 is greater as the screw diameter having the greater diameter of the female threads 27, 28 approaches the screw diameter of the male threads 29 having the smaller diameter of the mounting bolt 17, and becomes smaller as going apart. In other words, the torque increase rate is greater as the peripheral length of the female threads 27, 28 is closer to the peripheral length of the male threads 29.

When loosening the tightening screw through rotation of the operating ring 15 in the loosening direction, since the rotation of flange ring 11 is blocked as the flange ring 11 hits against the object such as the rotary tool 22, the nut rings 13, 14 are in their rotating state, as discussed above, in the loosening direction. As the rotary operation of the rotating ring 12 in the loosening direction revolves the nut rings 13, 14, the nut rings 13, 14 are rotated in the loosening direction with the same increased torque force as discussed above with respect to operation of the device in the tightening direction.

Consequently, as the nut rings 13, 14 are loosened, and the flange ring 11 looses contact with the object such as the rotary tool, the entire tightening screw 10 will rotate in one body due to internal loading or friction between the components, and the rotation of the rotating ring 12 becomes the rotation of the nut rings 13, 14, so that loosening may be quickened.

In the embodiment described herein, the two nut rings 13, 14 are used, but it is possible to use only one nut ring, or three or more. When utilizing a plurality of nut rings, it is desired to distribute the engaging positions with the bolts to be tightened uniformly so as to apply uniform loads to the bolts to be tightened. In the described embodiment, meanwhile, the tightening screw 10 is rotated by hand, but a wrench or other power tool may be also used. In this case, it is possible to tighten with less effort.

It will be apparent to those skilled in the art that various modifications and variations can be made in the present invention without departing from the scope or spirit of the invention. It is intended that the present invention cover such modifications and variations as come within the scope of the appended claims and their equivalents.

What is claimed is:

1. A torque enhancing tightening screw configured to be received on a threaded drive spindle to hold a rotary tool relative to the drive spindle, said screw comprising:

at least a first screw member defining an inner diameter opening for receipt of said threaded drive spindle, said inner diameter opening having female threads defined therein for engagement with male threads defined on said drive spindle, said inner diameter opening having a diameter greater than the diameter of said drive spindle so as to be eccentric relative to said drive spindle;

a rotating ring disposed about said screw member, said screw member in driving contact with said rotating ring and rotatable and revolvable within said rotating ring; and a mechanism configured for rotating said rotating ring such that rotational forces are imparted to said screw member through driving contact with said rotating ring causing said screw member to rotate about said drive spindle in an eccentric path, a portion of said female threads thereby engaging with said male threads in said eccentric path causing said screw to advance along said drive spindle.

2. The screw as in claim 1, further comprising at least one additional said screw member disposed so as to be eccentric about said drive spindle and in driving contact with said rotating ring, the portion of said female threads of said additional screw member contacting said male threads being opposite said contacting female threads of said first screw member.

3. The screw as in claim 1, wherein said female threads are of essentially the same pitch as the male threads on said drive spindle.

4. The screw as in claim 1, wherein said mechanism configured for rotating said rotating ring comprises an operating ring disposed concentric about said rotating ring, said rotating ring being non-rotatable relative said operating ring.

5. The screw as in claim 4, wherein said rotating ring is press fitted into said operating ring.

6. The screw as in claim 4, wherein said operating ring comprises a grip enhancing outer circumferential surface for an operator to grasp and rotate said operating ring.

7. The screw as in claim 1, further comprising a flange member disposed so as to contact a rotary tool upon tightening of said screw onto said drive spindle.

8. The screw as in claim 7, further comprising bearing members operably disposed between said flange member and said rotating ring and between said rotating ring and said screw member.

9. The screw as in claim 8, wherein internal friction between said flange member, said rotating ring, said screw member, and said bearing members causes said screw to rotate as a unitary object until said flange member contacts a rotary tool causing said internal friction to be overcome upon further rotating of said rotating ring.

10. A torque enhancing mechanism for tightening a tool to a threaded drive spindle, said mechanism comprising:

a threaded member configured for threadedly engaging with complimenting threads on said drive spindle;

a ring member disposed circumferentially around said threaded member and rotatable relative said threaded member;

a rotational force imparting device in contact with said ring member for transmitting an applied rotational force to said ring member to rotate said ring member; and an eccentric transmission device configured with said ring member for transmitting rotational movement of said ring member to said threaded member at an increased torque.

11. The mechanism as in claim 10, wherein said eccentric transmission device comprises at least one rotatable screw member, said screw member being eccentric relative to said ring member and in driven contact with said ring member so as to travel in an eccentric path within said ring member upon rotation of said ring member, said threaded member comprising a threaded inner diameter face defined in said screw member which threadedly engages with threads on said drive spindle as said screw member rotates about said drive spindle.

12. The mechanism as in claim 10, further comprising a flange member disposed adjacent said ring member for contacting a tool to be held by said mechanism, said ring member being rotatable relative said flange member.

13. The mechanism as in claim 10, wherein said rotational force imparting device comprises an operating ring configured concentric about said ring member.

14. The mechanism as in claim 13, wherein said operating ring is non-rotatable relative said ring member, said operating ring defining a grasping surface for grasping and tightening said mechanism.

\* \* \* \* \*